（12） United States Patent
Matsusue (10) Patent No.: US 11,862,825 B2
(45) Date of Patent: Jan. 2, 2024

(54) FUEL CELL SYSTEM (71) Applicant: TOYOTA JIDOSHA KABUSHIKI KAISHA, Toyota (JP)

(72) Inventor: Masaaki Matsusue, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 196 days.

(21) Appl. No.: 17/220,449

(22) Filed: Apr. 1, 2021

(65) Prior Publication Data
US 2021/0313601 A1 Oct. 7, 2021

(30) Foreign Application Priority Data

Apr. 7, 2020 (JP) ................. 2020-069105

(51) Int. Cl.
H01M 8/04225 (2016.01)
H01M 8/04302 (2016.01)
H01M 8/04746 (2016.01)

(52) U.S. Cl.
CPC ... *H01M 8/04225* (2016.02); *H01M 8/04302* (2016.02); *H01M 8/04761* (2013.01)

(58) Field of Classification Search
CPC ......... H01M 8/04201; H01M 8/04225; H01M 8/04302; H01M 8/04388; H01M 8/04395; H01M 8/04761
See application file for complete search history.

(56) References Cited

U.S. PATENT DOCUMENTS

2004/0081869 A1* 4/2004 Morishima ....... H01M 8/04007
429/415
2005/0130008 A1* 6/2005 Uozumi ................... F04F 5/54
429/513

FOREIGN PATENT DOCUMENTS

| CN | 1692517 A | 11/2005 |
|---|---|---|
| JP | 2003-157875 A | 5/2003 |
| JP | 2003-168456 A | 6/2003 |
| JP | 2008-192514 A | 8/2008 |
| WO | WO 2004/038838 A2 | 5/2004 |

* cited by examiner

Primary Examiner — Brian R Ohara
Assistant Examiner — Brent C Thomas
(74) Attorney, Agent, or Firm — Finnegan, Henderson, Farabow, Garrett & Dunner, LLP (57) ABSTRACT To provide a fuel cell system configured to, at the time of starting the fuel cell system, purge gas other than fuel gas from the fuel electrodes of a fuel cell stack in a short time. A fuel cell system comprising: a fuel cell stack, an ejector set, a fuel gas supplier, a circulation flow path, a mixed gas supply flow path, a pressure detector which detects pressure information of a fuel electrode side of the fuel cell stack, a fuel off-gas discharger which discharges the fuel off-gas, in which a concentration of the fuel gas is a predetermined concentration or less, to the outside, and a controller, wherein the ejector set includes a first ejector and a second ejector in parallel, the first ejector being an ejector which supplies first mixed gas to the fuel electrodes of the fuel cell stack, and the second ejector being an ejector which supplies second mixed gas, in which a content ratio of the circulation gas is larger than the first mixed gas, to the fuel electrodes of the fuel cell stack.

4 Claims, 3 Drawing Sheets

FUEL CELL SYSTEM

TECHNICAL FIELD

The disclosure relates to a fuel cell system.

BACKGROUND

A fuel cell is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells. Hereinafter, fuel gas and oxidant gas may be collectively and simply referred to as "reaction gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane").

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer, goes through the flow path and then is discharged to the outside of the system.

Such a method is known, that at the time of terminating the fuel cell system including the fuel cell stack, the supply of fuel gas to the fuel electrodes of the fuel cell stack is terminated; the fuel gas in the fuel electrodes of the fuel cell stack is released into the air; and the fuel electrodes of the fuel cell stack are filled with gas other than fuel gas, such as air and nitrogen gas (hereinafter, it may be referred to as "inert gas"). Accordingly, at the time of starting the fuel cell system, it is necessary to replace the inert gas in the fuel electrodes of the fuel cell stack with fuel gas.

The fuel cell system which is capable of purging gas other than fuel gas from the fuel electrodes of the fuel cell stack in a short time at starting moment, is under study.

For example, a fuel cell system is disclosed in Patent Literature 1, which uses such inverse circulation properties of an ejector, that by setting the supply amount of fuel gas at the starting moment to the range where the fuel gas flows inversely from an ejector through a circulation passage to a fuel cell, the fuel gas flows from the ejector to the inlet port of the fuel cell through a fuel supply passage and, at the same time, flows from the ejector to the fuel cell through the circulation passage; moreover, by using the inverse circulation properties, inert gas filling the circulation passage and the fuel supply passage can flow from the ejector to a purge line, thereby certainly purging air and so on from the piping in a short time.

Patent Literature 2 discloses a fuel cell system which is equipped with a plurality of ejectors that are connected in series and which is capable of quick activation even under a low-temperature environment where the check valve of a circulation gas flow path is in danger of being frozen.

Patent Literature 1: Japanese Patent Application Laid-Open (JP-A) No. 2003-157875

Patent Literature 2: JP-A No. 2008-192514

The fuel cell system described in Patent Literature 1 uses the inverse circulation properties of the ejector. Accordingly, inert gas is likely to remain especially on the side far from the fuel gas supply port of a fuel cell stack. As a result, there is a possibility that the inert gas cannot be absolutely purged from the fuel electrodes of the fuel cell stack in a short time.

From the viewpoint of purging, it is ideal to install a hydrogen pump in a circulation flow path and to purge the inert gas from the fuel electrodes after the inert gas in the fuel cell stack is stirred and circulated. However, the hydrogen pump is expensive and difficult to install in the fuel cell system from the viewpoint of encouraging the spread of vehicles equipped with a fuel cell.

SUMMARY

The disclosed embodiments were achieved in light of the above circumstances. A main object of the disclosed embodiments is to provide a fuel cell system configured to, at the time of starting the fuel cell system, purge gas other than fuel gas from the fuel electrodes of a fuel cell stack in a short time.

In a first embodiment, there is provided a fuel cell system comprising:

a fuel cell stack, an ejector set, a fuel gas supplier which supplies fuel gas to the elector set, a circulation flow path which recovers fuel off-gas discharged from the fuel cell stack and returns the fuel off-gas as circulation gas to the ejector set, a mixed gas supply flow path which connects the ejector set with the fuel cell stack and enables supply of mixed gas containing the fuel gas and the circulation gas from the ejector set to fuel electrodes of the fuel cell stack, a pressure detector which detects pressure information of a fuel electrode side of the fuel cell stack, a fuel off-gas discharger which discharges the fuel off-gas, in which a concentration of the fuel gas is a predetermined concentration or less, to the outside, and a controller, wherein the ejector set includes a first ejector and a second ejector in parallel, the first ejector being an ejector which supplies first mixed gas to the fuel electrodes of the fuel cell stack, and the second ejector being an ejector which supplies second mixed gas, in which a content ratio of the circulation gas is larger than the first mixed gas, to the fuel electrodes of the fuel cell stack;

wherein, for the second ejector, a supply flow amount of the mixed gas which can be supplied to the fuel electrodes of the fuel cell stack, is smaller than the first ejector;

wherein, as a first control, in the case where the pressure information detected by the pressure detector exceeds a predetermined first threshold value, the controller makes a usage ratio of the second ejector larger than a usage ratio of the first elector when a total usage ratio of the electors of the ejector set is determined as 100%; and wherein, as a second control, in the case where the pressure information detected by the pressure detector exceeds a predetermined second threshold value which is larger than the first threshold value, after the first control, the controller makes the usage ratio of the first ejector larger than the usage ratio of the second ejector when the total usage ratio of the ejectors of the ejector set is determined as 100%.

The fuel cell system of the disclosed embodiments may be a fuel cell system wherein, as the first control, in the case where the pressure information detected by the pressure detector is the predetermined first threshold value or less, the controller makes the usage ratio of the first ejector larger than the usage ratio of the second ejector when the total usage ratio of the ejectors of the ejector set is determined as 100%.

The fuel cell system of the disclosed embodiments may be a fuel cell system wherein, as the first control, in the case where the pressure information detected by the pressure detector exceeds the predetermined first threshold value, the controller switches from the first ejector to the second ejector and supplies the second mixed gas from the second ejector to the fuel electrodes of the fuel cell stack, and wherein, as the second control, in the case where the pressure information detected by the pressure detector exceeds the predetermined second threshold value which is larger than the predetermined first threshold value, the controller switches from the second ejector to the first ejector and supplies the first mixed gas from the first ejector to the fuel electrodes of the fuel cell stack, and in the case where the pressure information is the second threshold value or less, the controller supplies the second mixed gas from the second ejector to the fuel electrodes of the fuel cell stack.

The fuel cell system of the disclosed embodiments may be a fuel cell system wherein, as the first control, in the case where the pressure information detected by the pressure detector is the predetermined first threshold value or less, the controller supplies the first mixed gas from the first ejector to the fuel electrodes of the fuel cell stack.

According to the disclosed embodiments, the fuel cell system configured to, at the time of starting the fuel cell system, purge gas other than fuel gas from the fuel electrodes of the fuel cell stack in a short time, is provided.

BRIEF DESCRIPTION OF THE DRAWINGS

In the accompanying drawings.

DETAILED DESCRIPTION

The fuel cell system of the disclosed embodiments is a fuel cell system comprising:
a fuel cell stack,
an ejector set,
a fuel gas supplier which supplies fuel gas to the ejector set,
a circulation flow path which recovers fuel off-gas discharged from the fuel cell stack and returns the fuel off-gas as circulation gas to the ejector set,
a mixed gas supply flow path which connects the ejector set with the fuel cell stack and enables supply of mixed gas containing the fuel gas and the circulation gas from the ejector set to fuel electrodes of the fuel cell stack,
a pressure detector which detects pressure information of a fuel electrode side of the fuel cell stack,
a fuel off-gas discharger which discharges the fuel off-gas, in which a concentration of the fuel gas is a predetermined concentration or less, to the outside, and
a controller,
wherein the ejector set includes a first ejector and a second ejector in parallel, the first ejector being an ejector which supplies first mixed gas to the fuel electrodes of the fuel cell stack, and the second ejector being an ejector which supplies second mixed gas, in which a content ratio of the circulation gas is larger than the first mixed gas, to the fuel electrodes of the fuel cell stack;
wherein, for the second elector, a supply flow amount of the mixed gas which can be supplied to the fuel electrodes of the fuel cell stack, is smaller than the first ejector;
wherein, as a first control, in the case where the pressure information detected by the pressure detector exceeds a predetermined first threshold value, the controller makes a usage ratio of the second ejector larger than a usage ratio of the first ejector when a total usage ratio of the ejectors of the ejector set is determined as 100%; and
wherein, as a second control, in the case where the pressure information detected by the pressure detector exceeds a predetermined second threshold value which is larger than the first threshold value, after the first control, the controller makes the usage ratio of the first ejector larger than the usage ratio of the second ejector when the total usage ratio of the ejectors of the ejector set is determined as 100%.

Figure 1:
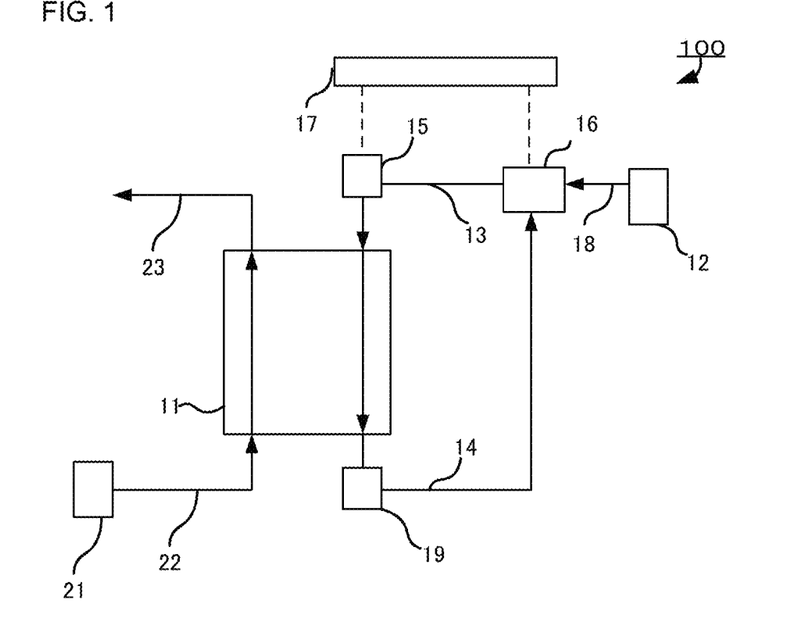
FIG. 1 is a view of an example of the structure of the fuel cell system according to the disclosed embodiments.

FIG. 1 is a view of an example of the structure of the fuel cell system according to the disclosed embodiments.

A fuel cell system 100 shown in FIG. 1 includes the following: a fuel cell stack 11; a fuel gas supplier 12; a mixed gas supply flow path 13; a circulation flow path 14 which circulates, as circulation gas, fuel off-gas discharged from the fuel electrodes of the fuel cell stack 11; a pressure detector 15 which detects the pressure information of the fuel electrode side of the fuel cell stack 11; an ejector set 16 which supplies mixed gas of the fuel gas and the circulation gas to the fuel electrodes of the fuel cell stack 11; a controller 17; a fuel gas supply flow path 18; a fuel off-gas discharger 19; an oxidant gas supplier 21; an oxidant gas supply flow path 22; and an oxidant gas discharge flow path 23.

The fuel cell system of the disclosed embodiments includes at least the fuel cell stack, the fuel gas supplier, the mixed gas supply flow path, the circulation flow path, the fuel off-gas discharger, the pressure detector, the ejector set and the controller. In general, the fuel cell system further includes a fuel gas supply flow path, an oxidant gas supplier, an oxidant gas supply flow path, an oxidant gas discharge flow path, a cooling water supplier, a cooling water circulation flow path, etc.

The fuel cell stack is composed of stacked unit fuel cells.

The number of the stacked unit fuel cells is not particularly limited. For example, 2 to 200 unit fuel cells may be stacked.

The fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have such a gas flow path structure, that a groove is formed as a reaction gas flow path on a surface in contact with a gas diffusion layer. Also, the separators may have such a cooling water flow path structure, that a groove is formed on an opposite surface to the surface in contact with the gas diffusion layer, as a cooling water flow path for keeping the stack temperature at a constant level.

The separators may be a gas-impermeable, electroconductive member, etc. As the electroconductive member, examples include, but are not limited to, gas-impermeable dense carbon obtained by carbon densification, and a metal plate obtained by press molding. The separators may have a current collection function.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The fuel gas supplier supplies fuel gas to the ejector set.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel cell system may include the fuel gas supply flow path.

The fuel gas supply flow path connects the fuel gas supplier with the ejector set and enables the supply of the fuel gas from the fuel gas supplier to the ejector set. The fuel gas supply flow path is not always necessary when the fuel gas supplier and the ejector set are disposed adjacent to each other, and the fuel gas can be directly supplied from the fuel gas supplier to the ejector set.

The circulation flow path enables that it connects the fuel cell stack with the ejector set, recovers the fuel off-gas discharged from the fuel electrodes of the fuel cell stack, and returns the fuel off-gas as the circulation gas to the ejector set.

The fuel off-gas mainly contains fuel gas, which passed through the fuel electrode while remaining unreacted, and moisture, which is water generated at the oxidant electrode and delivered to the fuel electrode. In the disclosed embodiments, the fuel off-gas may further contain inert gas such as air and nitrogen gas.

The ejector set supplies the mixed gas containing the fuel gas and the circulation gas to the fuel electrodes of the fuel cell stack.

The ejector set includes the first ejector and the second ejector in parallel.

The first ejector supplies the first mixed gas to the fuel electrodes of the fuel cell stack.

The second ejector supplies the second mixed gas, in which the content ratio of the circulation gas is larger than the first mixed gas, to the fuel electrodes of the fuel cell stack. For the second ejector, the supply flow amount of the mixed gas which can be supplied to the fuel electrodes of the fuel cell stack, is smaller than the first ejector.

The supply flow amount of the first mixed gas that can be supplied to the fuel electrodes of the fuel cell stack by the first ejector, may be 2 to 20 times larger than the supply flow amount of the second mixed gas that can be supplied to the fuel electrodes of the fuel cell stack by the second ejector, or it may be 3 to 10 times larger than that.

In the second mixed gas, the content ratio of the circulation gas may be 2 to 10 times larger than the first mixed gas, or it may be 3 to 4 times larger than the first mixed gas, for example.

The ejectors of the ejector set are electrically connected with the controller. The use of the ejectors in combination or the use of any one of the ejectors may be enabled by a signal from the controller.

Figure 2:
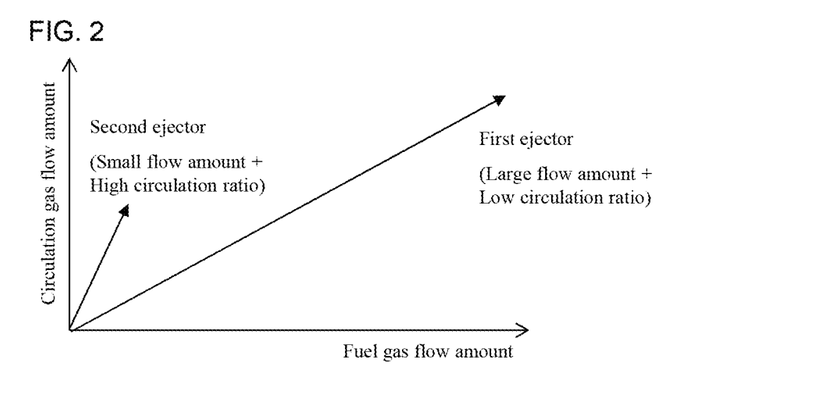
FIG. 2 is a view showing a difference in performance between the first ejector and the second ejector.

FIG. 2 is a view showing a difference in performance between the first ejector and the second elector.

As shown in FIG. 2, the first ejector is such an ejector that the supply flow amount is large and the content ratio of the circulation gas is small (large flow amount+low circulation ratio).

The second ejector is such an ejector that the supply flow amount is small and the content ratio of the circulation gas is large (small flow amount T high circulation ratio).

The mixed gas supply flow path connects the ejector set with the fuel cell stack and enables the supply of the mixed gas containing the fuel gas and the circulation gas from the ejector set to the fuel electrodes of the fuel cell stack.

The fuel off-gas discharger enables the discharge of the fuel off-gas, in which the concentration of the fuel gas is the predetermined concentration or less, to the outside. The outside means the outside of the fuel cell system.

The fuel off-gas discharger may include a fuel off-gas discharge valve. As needed, it may further include a fuel off-gas discharge flow path.

The fuel off-gas discharge valve controls the fuel off-gas discharge flow amount.

The fuel off-gas discharge flow path may branch from the circulation flow path.

The fuel off-gas discharger may enable the discharge of the fuel off-gas to the outside when, for example, the concentration of the fuel gas such as hydrogen in the fuel off-gas is the predetermined concentration or less. Also, the fuel off-gas discharger may discharge, for example, inert gas other than the fuel gas, such as air and nitrogen gas, to the outside. The predetermined concentration of the fuel gas is not particularly limited and may be appropriately determined considering the balance between the fuel efficiency of the fuel cell system and the inert gas purging time, for example.

The method for detecting the concentration of the fuel gas in the fuel off-gas is not particularly limited. For example, a conventionally-known concentration sensor may be used.

A gas-liquid separator for reducing the moisture in the fuel off-gas, may be installed in the circulation flow path. Also, a drain flow path, which branches from, the circulation flow path by the gas-liquid separator, may be installed in the circulation flow path, and a drain valve may be installed in the drain flow path.

The moisture separated from the fuel off-gas in the gas-liquid separator may be discharged by opening the drain valve of the drain flow path branching from the circulation flow path.

The fuel off-gas subjected to the moisture separation may be suctioned from the circulation flow path by the ejector, while it is in the state of containing a slight amount of remaining mist.

The pressure detector detects the pressure information of the fuel electrode side of the fuel cell stack.

As the pressure detector, examples include, but are not limited to, a pressure sensor.

The installation position of the pressure detector is not particularly limited, as long as the pressure information of the fuel electrode side of the fuel cell stack can be detected. The pressure detector may be installed in the mixed gas supply flow path, or it may be installed in the circulation flow path. From the viewpoint of increasing the accuracy of the pressure information detection, the pressure detector may be installed in the mixed gas supply flow path.

The pressure information may be a gas pressure applied to the fuel cell stack.

The oxidant gas supplier supplies oxidant gas to at least the oxidant electrodes of the fuel cell stack.

As the oxidant gas supplier, for example, an air compressor may be used.

The oxidant gas supply flow path enables that it connects the oxidant gas supplier with the fuel cell stack and supplies oxidant gas from the oxidant gas supplier to the oxidant electrodes of the fuel cell stack.

The oxidant gas is oxygen-containing gas. It may be air, dry air, pure oxygen or the like.

The oxidant gas discharge flow path enables the discharge of the oxidant gas from the oxidant electrodes of the fuel cell stack.

The fuel cell system may include a cooling water supplier and a cooling water circulation flow path.

The cooling water circulation flow path enables that it communicates between the cooling water inlet port communication hole and cooling water outlet port communication hole installed in the fuel cell stack, circulates the cooling water supplied from the cooling water supplier in and out of the fuel cell stack, and cools down the fuel cell stack.

As the cooling water supplier, examples include, but are not limited to, a cooling water pump.

The controller controls the fuel cell system.

The controller may be connected with the pressure detector, the ejector set, the fuel gas supplier, the oxidant gas supplier and so on through an input-output interface.

The controller makes a judgement on whether or not the pressure information of the fuel electrode side of the fuel cell stack detected by the pressure detector exceeds the predetermined first threshold value and on whether or not the pressure information exceeds the predetermined second threshold value. Also, the controller controls the usage ratio of the first and second ejectors of the ejector set, etc.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes.

(1) Detection of the Pressure Information of the Fuel Electrode Side of the Fuel Cell Stack The pressure detector detects the pressure information of the fuel electrode side of the fuel cell stack at predetermined times.

The method for detecting the pressure information of the fuel electrode side of the fuel cell stack, is not particularly limited. For example, the pressure information of the fuel electrode side of the fuel cell stack may be detected by installing a conventionally-known pressure sensor in the fuel cell system and using the pressure sensor.

The timing for detecting the pressure information of the fuel electrode side of the fuel cell stack, is not particularly limited. The pressure information of the fuel electrode side of the fuel cell stack may be detected every time a predetermined time elapses after the operation of the fuel cell stack is started; it may be detected when the operation of the fuel cell stack is started; or it may be constantly detected. The detection time may be appropriately determined.

(2) Judgement on Whether or not the Pressure Information of the Fuel Electrode Side of the Fuel Cell Stack Exceeds the Predetermined First Threshold Value The controller judges whether or not the pressure information of the fuel electrode side of the fuel cell stack detected by the pressure detector exceeds the predetermined first threshold value.

The first threshold value of the pressure information can be appropriately determined as follows, for example: data group showing a correlation between the pressure information of the fuel electrode side of the fuel cell stack and the time to complete the purging of the inert gas from the fuel electrodes of the fuel cell stack, are prepared in advance by an experiment, etc., and the first threshold value is appropriately determined by the performance, etc., of the fuel cell stack obtained from the data group.

(3) First Control (3-1) The Case where the Pressure Information of the Fuel Electrode Side of the Fuel Cell Stack Exceeds the Predetermined First Threshold Value As the first control, in the case where the pressure information detected by the pressure detector exceeds the predetermined first threshold value, the controller makes the usage ratio of the second ejector larger than the usage ratio of the first ejector when the total usage ratio of the ejectors of the ejector set is determined as 100%.

Before the first control, the supply flow amount of the first mixed gas in which the content ratio of the fuel gas is large, is increased to pressure-fill the fuel electrodes of the fuel cell stack with the fuel gas. The gas which is other than the fuel gas and contains large amounts of nitrogen, etc., is pushed out by the pressure-filling, and the gas circulates and enters the fuel electrodes of the fuel cell stack through the ejector set, again. At this time, the usage ratio of the second ejector in which, compared to the first elector, the supply flow amount of the mixed gas is small and the content ratio of the circulation gas is larger than the fuel gas, is increased, thereby decreasing the supply flow amount of the mixed gas from the ejector set. Accordingly, it is thought that the first mixed gas in which the content ratio of the fuel gas is large, can be quickly diffused in the fuel electrodes of the fuel cell stack. As a result, it is thought that the fuel gas can be quickly introduced into the fuel electrodes of the fuel cells, which are on the side far from the fuel gas supply port of the fuel cell stack. Accordingly, it can be said that the use of the second ejector is appropriate for uniform purging of the inert gas from the fuel electrodes.

The usage ratio of the ejectors of the ejector set in the case where the pressure information of the fuel electrode side of the fuel cell stack exceeds the predetermined first threshold value, is not particularly limited, as long as the usage ratio of the second ejector is larger than the usage ratio of the first ejector when the total usage ratio of the ejectors is determined as 100%. From the viewpoint of completing the purging of the inert gas in a shorter time, the usage ratio of the second ejector may be 100%. In other words, in the case where the pressure information of the fuel electrode side of the fuel cell stack detected by the pressure detector exceeds the predetermined first threshold value, the controller may switch from the first ejector to the second ejector and supply the second mixed gas from the second ejector to the fuel electrodes of the fuel cell stack.

The method for controlling the usage ratio of the ejectors is not particularly limited. The usage ratio may be controlled by electrically connecting the controller with the ejectors and delivering a signal from the controller to the ejectors.

(3-2) The Case where the Pressure Information of the Fuel Electrode Side of the Fuel Cell Stack is the Predetermined First Threshold Value or Less On the other hand, as the first control, in the case where the pressure information of the fuel electrode side of the fuel cell stack detected by the pressure detector is the predetermined first threshold value or less, the controller makes the usage ratio of the first ejector larger than the usage ratio of the second ejector when the total usage ratio of the ejectors of the ejector set is determined as 100%. At the time of starting the fuel cell system, from the viewpoint of quickly pressure-filling the fuel electrodes of the fuel cell stack with the first mixed gas in which the fuel gas ratio is large, the controller makes the usage ratio of the first ejector larger than the usage ratio of the second ejector when the total usage ratio of the ejectors of the ejector set is determined as 100%.

The usage ratio of the ejectors of the ejector set in the case where the pressure information of the fuel electrode side of the fuel cell stack detected by the pressure detector is the predetermined first threshold value or less, is not particularly limited, as long as the usage ratio of the first ejector is larger than the usage ratio of the second ejector when the total usage ratio of the ejectors is determined as 100%. From the viewpoint of quickly pressure-filling the fuel electrodes of the fuel cell stack with the first mixed gas in which the fuel gas ratio is large, the usage ratio of the first ejector may be 100%. In other words, in the case where the pressure information of the fuel electrode side of the fuel cell stack detected by the pressure detector is the predetermined first threshold value or less, the controller may switch from the second ejector to the first elector and supply the first mixed gas from the first ejector to the fuel electrodes of the fuel cell stack.

(4) Detection of the Pressure Information of the Fuel Electrode Side of the Fuel Cell Stack After the first control, the pressure detector detects the pressure information of the fuel electrode side of the fuel cell stack at predetermined times.

The timing for detecting the pressure information of the fuel electrode side of the fuel cell stack, is not particularly limited. The pressure information of the fuel electrode side of the fuel cell stack may be detected every time a predetermined time elapses after the first control, or it may be constantly detected. The detection time may be appropriately determined.

(5) Judgement on Whether or not the Pressure Information of the Fuel Electrode Side of the Fuel Cell Stack Exceeds the Predetermined Second Threshold Value After the first control, the controller judges whether or not the pressure information of the fuel electrode side of the fuel cell stack detected by the pressure detector exceeds the predetermined second threshold value.

The second threshold value of the pressure information can be appropriately determined as follows, for example: data group showing a correlation between the pressure information of the fuel electrode side of the fuel cell stack and the time to complete the purging of the inert gas from the fuel electrodes of the fuel cell stack, are prepared in advance by an experiment, etc., and the second threshold value can be appropriately determined by the performance, etc., of the fuel cell stack included in the data group.

(6) Second Control (6-1) The Case where the Pressure Information of the Fuel Electrode Side of the Fuel Cell Stack Exceeds the Predetermined Second Threshold Value As the second control, in the case where the pressure information detected by the pressure detector exceeds the predetermined second threshold value which is larger than the first threshold value, after the first control, the controller may make the usage ratio of the first ejector larger than the usage ratio of the second ejector when the total usage ratio of the ejectors of the ejector set is determined as 100%, and then the controller may terminate the control.

In the case where the pressure information exceeds the predetermined second threshold value, it is thought that the first mixed gas in which the fuel gas ratio is large, is sufficiently diffused in the fuel electrodes of the fuel cell stack, and the fuel gas is introduced into the fuel electrodes of the fuel cells, which are on the side far from the fuel gas supply port of the fuel cell stack. Accordingly, by the second control, the usage ratio of the first ejector in which, compared to the second ejector, the supply flow amount of the mixed gas is large and the content ratio of the fuel gas is larger than the circulation gas, is increased, thereby increasing the supply flow amount of the mixed gas from the ejector set. Accordingly, the pressure information of the fuel electrode side of the fuel cell stack can reach the predetermined target value for operating the fuel cell stack in a short time. Accordingly, it can be said that the use of the first ejector is appropriate for purging of the inert gas from the fuel electrodes in a short time.

The usage ratio of the ejectors of the ejector set in the case where the pressure information of the fuel electrode side of the fuel cell stack exceeds the predetermined second threshold value, is not particularly limited, as long as the usage ratio of the first ejector is larger than the usage ratio of the second ejector when the total usage ratio of the ejectors is determined as 100%. From the point of view that the pressure information of the fuel electrode side of the fuel cell stack can reach the predetermined target value for operating the fuel cell stack in a shorter time, the usage ratio of the first ejector may be 100%. In other words, in the case where the pressure information of the fuel electrode side of the fuel cell stack detected by the pressure detector exceeds the predetermined second threshold value, the controller may switch from the second ejector to the first ejector and supply the first mixed gas from the first ejector to the fuel electrodes of the fuel cell stack.

(6-2) The Case where the Pressure Information of the Fuel Electrode Side of the Fuel Cell Stack is the Second Threshold Value or Less Meanwhile, as the second control, in the case where the pressure information of the fuel electrode side of the fuel cell stack detected by the pressure detector is the predetermined second threshold value or less, after the first control, the controller may continue to make the usage ratio of the second ejector larger than the usage ratio of the first ejector when the total usage ratio of the ejectors of the ejector set is determined as 100%, or the controller may switch from the first ejector to the second ejector and supply the second mixed gas from the second ejector to the fuel electrodes of the fuel cell stack.

Figure 3:
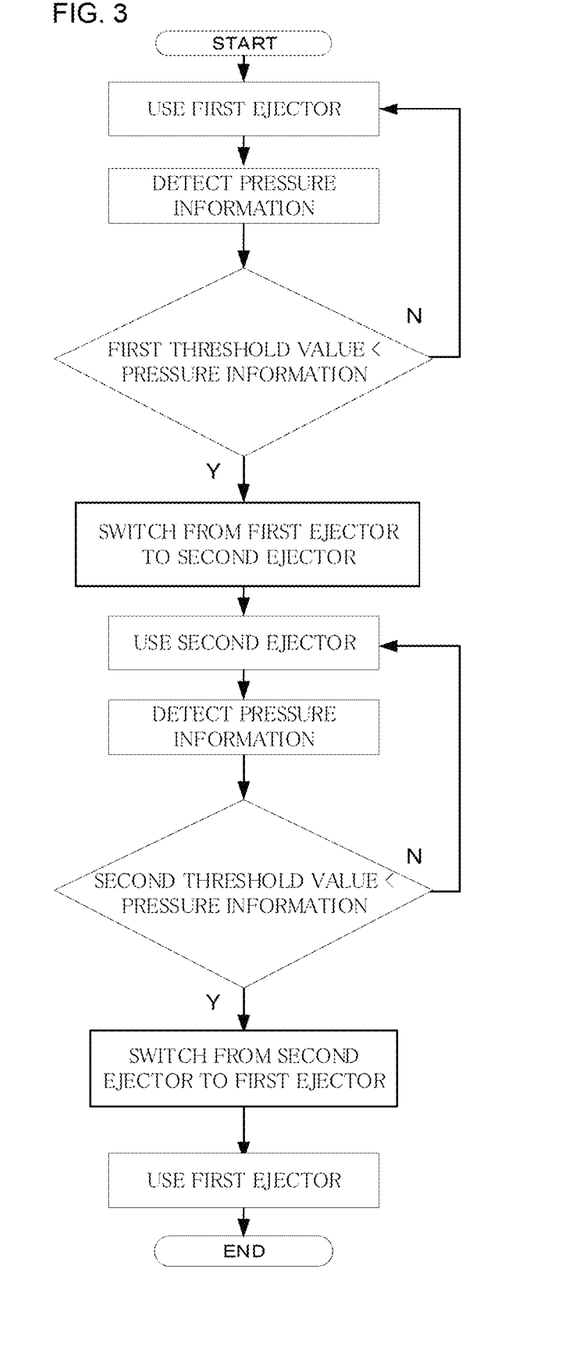
FIG. 3 is a flow chart of an example of the method for controlling the fuel cell system according to the disclosed embodiments.

FIG. 3 is a flow chart of an example of the method for controlling the fuel cell system according to the disclosed embodiments. The disclosed embodiments are not limited to this typical example.

In the control method shown in FIG. 3, first, at the time of starting the fuel cell system, the controller supplies the first mixed gas to the fuel electrodes of the fuel cell stack by using the first ejector.

Next, the pressure detector detects the pressure information of the fuel electrode side of the fuel cell stack.

Then, in the case where the detected pressure information of the fuel electrode side of the fuel cell stack is the predetermined first threshold value or less, the controller continues to supply the first mixed gas to the fuel electrodes of the fuel cell stack by using the first ejector.

On the other hand, in the case where the pressure information exceeds the first threshold value, the controller switches from the first ejector to the second ejector and supplies the second mixed gas to the fuel electrodes of the fuel cell stack.

Then, the pressure detector detects the pressure information of the fuel electrode side of the fuel cell stack, again.

Then, in the case where the detected pressure information of the fuel electrode side of the fuel cell stack is the predetermined second threshold value or less, the controller continues to supply the second mixed gas to the fuel electrodes of the fuel cell stack by using the second ejector.

On the other hand, in the case where the pressure information exceeds the second threshold value, the controller switches from the second ejector to the first ejector and supplies the first mixed gas to the fuel electrodes of the fuel cell stack. Then, the controller terminates the control.

Figure 4:
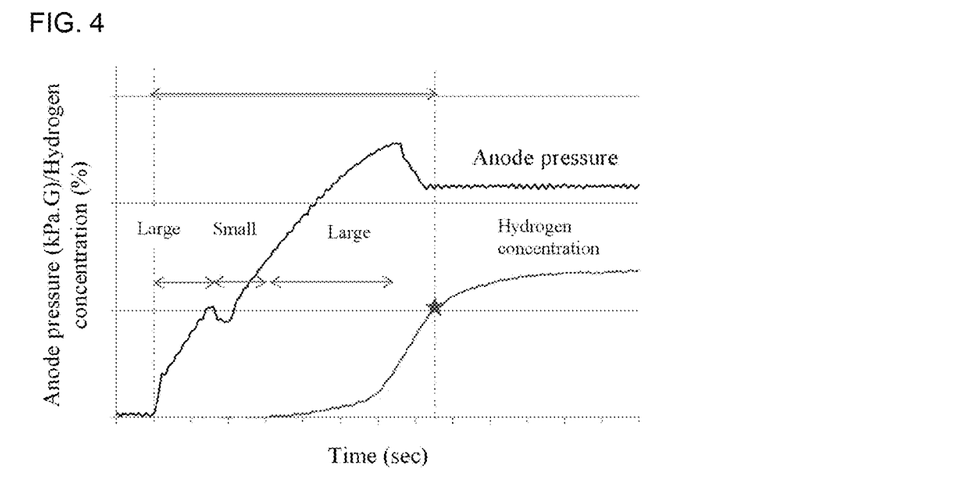
FIG. 4 is a view showing an example of the relationship between time and anode pressure/hydrogen concentration in the case of simulating the control of the fuel cell system according to the disclosed embodiments.

FIG. 4 is a view showing an example of the relationship between time and anode pressure/hydrogen concentration in the case of simulating the control of the fuel cell system according to the disclosed embodiments.

In FIG. 4, "Large" indicates the use of the first ejector, and "Small" indicates the use of the second ejector.

As is clear from FIG. 4, by carrying out the two-step control (the first control and the second control), the anode pressure increases in two steps, and the anode pressure and the hydrogen concentration of the anode can be increased to target values in a short time of 0.75 second.

Figure 5:
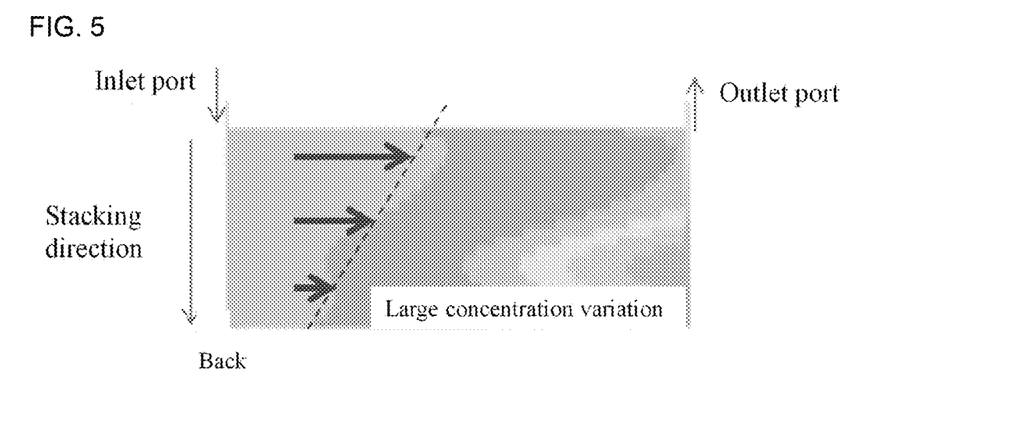
FIG. 5 is a view showing a gas concentration distribution on the fuel electrode side of the fuel cell stack at a predetermined timing in a simulation trying to purge nitrogen gas from the fuel electrodes of the fuel cell stack by using only the first ejector.

FIG. 5 is a view showing a gas concentration distribution on the fuel electrode side of the fuel cell stack at a predetermined timing in a simulation trying to purge nitrogen gas from the fuel electrodes of the fuel cell stack by using only the first ejector.

In FIG. 5, "Inlet port" indicates the fuel gas supply port; "Outlet port" indicates the fuel gas discharge port; "Stacking direction" indicates the direction of stacking the unit fuel cells of the fuel cell stack; and "Back" indicates the furthest side from the fuel gas supply port of the fuel cell stack. The same applies to FIG. 6 described below.

As is clear from FIG. 5, when nitrogen gas purging is carried out by using only the first ejector, there is a large concentration variation in the stacking direction of the unit fuel cells of the fuel cell stack.

Figure 6:
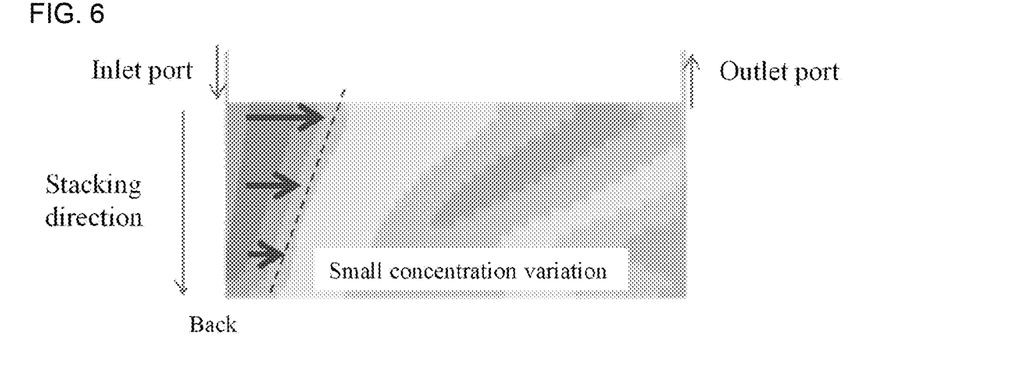
FIG. 6 is a view showing a gas concentration distribution on the fuel electrode side of the fuel cell stack at a predetermined timing in a simulation trying to purge nitrogen gas from the fuel electrodes of the fuel cell stack by controlling the fuel cell system of the disclosed embodiments.

FIG. 6 is a view showing a gas concentration distribution on the fuel electrode side of the fuel cell stack at a predetermined timing in a simulation trying to purge nitrogen gas from the fuel electrodes of the fuel cell stack by controlling the fuel cell system of the disclosed embodiments.

As is clear from FIG. 6, according to the fuel cell system of the disclosed embodiments, the concentration variation in the stacking direction of the unit fuel cells of the fuel cell stack, is small.

From the above results, it is thought that according to the fuel cell system of the disclosed embodiments, even when a hydrogen pump is not installed in the circulation flow path, the gas other than the fuel gas can be purged from the fuel electrodes of the fuel cell stack in a short time, by differently using the second ejector, which is appropriate for uniform purging and has high circulation properties, and the first ejector, which is appropriate for purging in a short time and is large in flow amount, depending on timing.

REFERENCE SIGNS LIST

11. Fuel cell stack
12. Fuel gas supplier
13. Mixed gas supply flow path
14. Circulation flow path
15. Pressure detector
16. Ejector set
17. Controller
18. Fuel gas supply flow path
19. Fuel off-gas discharger
21. Oxidant gas supplier
22. Oxidant gas supply flow path
23. Oxidant gas discharge flow path
100. Fuel cell system

The invention claimed is:
1. A fuel cell system comprising:
a fuel cell stack,
an ejector set,
a fuel gas supplier which supplies a fuel gas to the ejector set,
a circulation flow path which recovers a fuel off-gas discharged from the fuel cell stack and returns the fuel off-gas as circulation gas to the ejector set,
a mixed gas supply flow path which connects the ejector set with the fuel cell stack and enables supply of a mixed gas containing the fuel gas and the circulation gas from the ejector set to fuel electrodes of the fuel cell stack,
  wherein the ejector set includes a first ejector and a second ejector in parallel, the first ejector being an ejector which supplies a first mixed gas to the fuel electrodes of the fuel cell stack, and the second ejector being an ejector which supplies a second mixed gas, in which a content ratio of the circulation gas to the fuel gas is larger than in the first mixed gas, to the fuel electrodes of the fuel cell stack, and
  wherein, for the second ejector, a supply flow amount of the mixed gas which can be supplied to the fuel electrodes of the fuel cell stack, is smaller than a supply flow amount which can be supplied to the fuel electrodes by the first ejector;
a pressure detector which detects pressure information of a fuel electrode side of the fuel cell stack,
a fuel off-gas discharger which discharges the fuel off-gas, in which a concentration of the fuel gas is a predetermined concentration or less, to the outside, and
a controller that executes instructions to perform a first control and a second control to purge an inert gas from the fuel electrodes of the fuel cell stack, at the time of starting the fuel cell system, wherein
  the first control performed according to the instructions executed by the controller includes adjusting a usage ratio of the second ejector to be larger than a usage ratio of the first ejector with a total usage ratio of the ejectors of the ejector set being 100%, when the pressure information detected by the pressure detector exceeds a predetermined first threshold value; and
  the second control performed according to the instructions executed by the controller includes adjusting the usage ratio of the first ejector to be larger than the usage ratio of the second ejector with the total usage ratio of the ejectors of the ejector set being 100%, when the pressure information detected by the pressure detector exceeds a predetermined second threshold value.

2. The fuel cell system according to claim 1, wherein the first control performed according to the instructions executed by the controller includes adjusting the usage ratio of the first ejector to be larger than the usage ratio of the second ejector with the total usage ratio of the ejectors of the ejector set being 100%, when the pressure information detected by the pressure detector is the predetermined first threshold value or less.

3. The fuel cell system according to claim 1,
  wherein the first control performed according to the instructions executed by the controller includes switching from the first ejector to the second ejector and supplying the second mixed gas from the second ejector to the fuel electrodes of the fuel cell stack, when the pressure information detected by the pressure detector exceeds the predetermined first threshold value,
  wherein the second control performed according to the instructions executed by the controller includes switching from the second ejector to the first ejector and supplying the first mixed gas from the first ejector to the fuel electrodes of the fuel cell stack, when the pressure information detected by the pressure detector exceeds the predetermined second threshold value which is larger than the predetermined first threshold value, and
  wherein the controller executes instructions to supply the second mixed gas from the second ejector to the fuel electrodes of the fuel cell stack, when the pressure information detected by the pressure detector is less than or equal to the predetermined second threshold value.

4. The fuel cell system according to claim 1, wherein the first control performed according to the instructions executed by the controller includes supplying the first mixed gas from the first ejector to the fuel electrodes of the fuel cell stack, when the pressure information detected by the pressure detector is less than or equal to the predetermined first threshold value.

* * * * *